US011071024B2

(12) United States Patent
Yang

(10) Patent No.: US 11,071,024 B2
(45) Date of Patent: Jul. 20, 2021

(54) METHOD AND DEVICE FOR OBTAINING CELL INFORMATION

(71) Applicant: VIVO MOBILE COMMUNICATION CO., LTD., Dongguan (CN)

(72) Inventor: Xiaodong Yang, Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/032,776

(22) Filed: Sep. 25, 2020

(65) Prior Publication Data

US 2021/0014747 A1 Jan. 14, 2021

Related U.S. Application Data

(63) Continuation of application No. PCT/CN2019/078631, filed on Mar. 19, 2019.

(30) Foreign Application Priority Data

Mar. 27, 2018 (CN) .......................... 201810260183.9

(51) Int. Cl.
*H04W 36/04* (2009.01)
*H04W 36/00* (2009.01)
(Continued)

(52) U.S. Cl.
CPC ... *H04W 36/0058* (2018.08); *H04W 36/0061* (2013.01); *H04W 36/04* (2013.01);
(Continued)

(58) Field of Classification Search
CPC ......... H04W 36/0058; H04W 36/0061; H04W 24/10; H04W 36/04
See application file for complete search history.

(56) References Cited

U.S. PATENT DOCUMENTS

2012/0051274 A1 3/2012 Song
2013/0040692 A1 2/2013 Chen et al.
(Continued)

FOREIGN PATENT DOCUMENTS

CN 101610536 A 12/2009
CN 102149093 A 8/2011
(Continued)

OTHER PUBLICATIONS

Extended European Search Report for European Application No. 19775957A, dated Apr. 29, 2021 (Apr. 29, 2021)—14 pages.
(Continued)

*Primary Examiner* — Barry W Taylor
(74) *Attorney, Agent, or Firm* — Culhane Meadows PLLC; Stephen J. Weed

(57) ABSTRACT

Embodiments of the present disclosure provides a method and device for obtaining cell information. The method incudes: when receiving measurement configuration information, according to target information, determining a target timing duration of a timer; wherein the measurement configuration information is configured to instruct the user equipment to obtain identifier information of a target cell, the target information includes at least one of frequency related information of the target cell, synchronization status of the target cell and a serving cell, capability information of the user equipment, and operation state related information of the user equipment; when the identifier information is obtained within the target timing duration, reporting the identifier information to a network device.

12 Claims, 2 Drawing Sheets

(51) Int. Cl.
  *H04W 36/08* (2009.01)
  *H04W 36/36* (2009.01)
  *H04W 56/00* (2009.01)
  *H04W 24/10* (2009.01)

(52) U.S. Cl.
  CPC ........... *H04W 36/08* (2013.01); *H04W 36/36* (2013.01); *H04W 56/001* (2013.01); *H04W 24/10* (2013.01)

(56) References Cited

U.S. PATENT DOCUMENTS

| | | | |
|---|---|---|---|
| 2013/0324119 A1 | 12/2013 | Shi et al. | |
| 2015/0215825 A1* | 7/2015 | Kim | H04W 36/0088 370/331 |
| 2017/0127434 A1 | 5/2017 | Kazmi | |
| 2019/0124533 A1* | 4/2019 | Tenny | H04L 5/0048 |
| 2019/0182880 A1* | 6/2019 | Yang | H04L 5/0094 |
| 2019/0246306 A1* | 8/2019 | Yang | H04W 24/10 |
| 2020/0296673 A1* | 9/2020 | Ouchi | H04W 52/325 |
| 2020/0336955 A1* | 10/2020 | Bao | H04W 36/0072 |
| 2020/0344629 A1* | 10/2020 | Kim | H04W 48/16 |
| 2020/0358547 A1* | 11/2020 | Liu | H04W 24/10 |

FOREIGN PATENT DOCUMENTS

| | | |
|---|---|---|
| CN | 102281578 A | 12/2011 |
| CN | 102291759 A | 12/2011 |
| CN | 102647747 A | 8/2012 |
| CN | 103283279 A | 9/2013 |
| CN | 106941677 A | 7/2017 |
| EP | 2887741 A1 | 6/2015 |

OTHER PUBLICATIONS

LG Electronics: "DRS-based measurement procedures with network assistance", RI-143170, 3GPP TSG RAN WG1 Meeting #78, Dresden, Germany, Aug. 18, 2014, 7 pages.

ZTE: "Thoughts about interaction between UTRA ANR and MDT", R2-110085, 3GPP TSG-RAN WG2 meeting #72bis, Dublin, Ireland, Jan. 17, 2011, 3 pages.

"Evolved Universal Terrestrial Radio Access (E-UTRA); Radio Resource Control (RRC); Protocol specification", 3GPP, ((3GPP TS 36. 331 V15. 0.1)), Jan. 2018, 776 pages.

1st Chinese Office Action for Chinese Application No. 201810260183.9, dated Apr. 4, 2020 (Apr. 4, 2020)—6 pagges (English translation—4 pages).

2nd Chinese Office Action for Chinese Application No. 201810260183.9, dated Jul. 29, 2020 (Jul. 29, 2020)—7 pages (English translation—5 pages).

International Search Report and Written Opinion for International Application No. PCT/CN2019/078631, dated Oct. 8, 20120 (Oct. 8, 2020)—9 pages (English translation—6 pages).

* cited by examiner

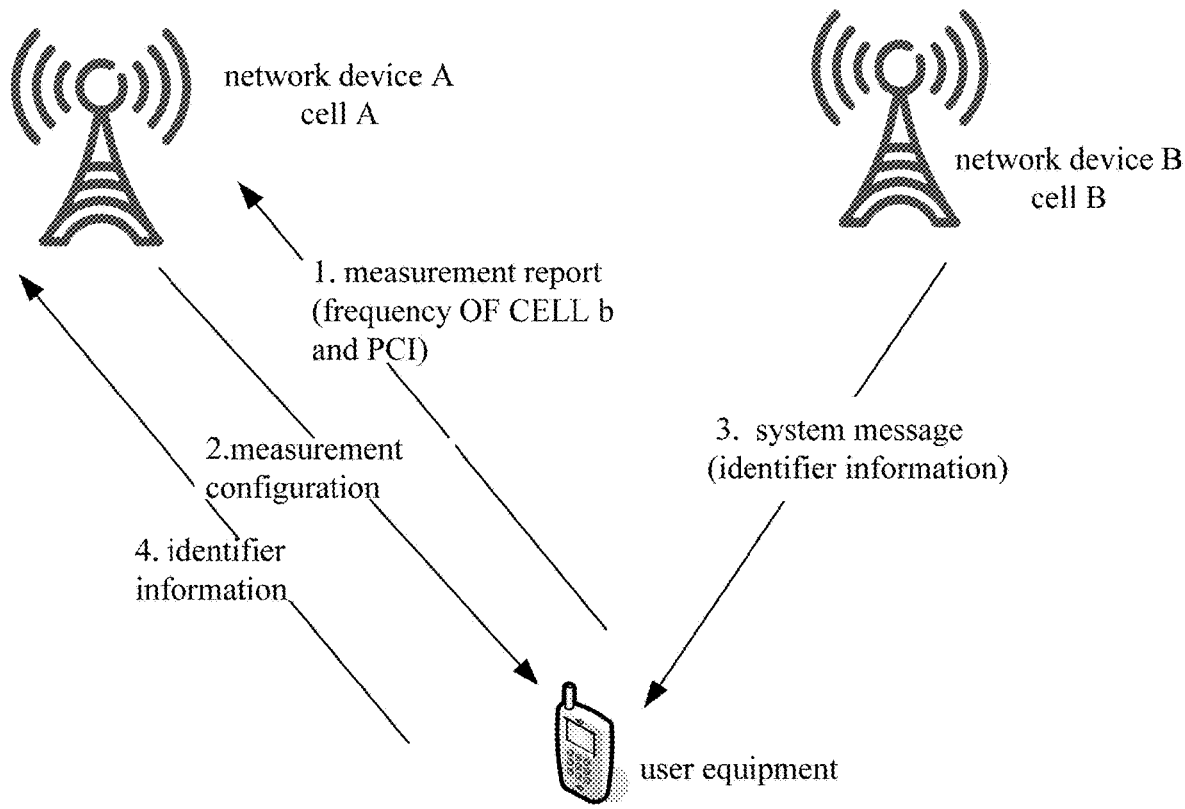

FIG. 1 when receiving measurement configuration information, according to target information, determining a target timing duration of a timer; where the measurement configuration information is used to instruct a user equipment to obtain identifier information of a target cell, the target information includes at least one of frequency related information of the target cell, synchronization status of the target cell and a serving cell, capability information of the user equipment, and operation state related information of the user equipment ⎯ S210 when the identifier information is obtained within the target timing duration, reporting the identifier information to the network device ⎯ S220

FIG. 2

METHOD AND DEVICE FOR OBTAINING CELL INFORMATION

CROSS-REFERENCE TO RELATED APPLICATION

This application is a continuation application of International Application No. PCT/CN2019/078631 filed on Mar. 19, 2019, which claims the benefit and priority of Chinese Application No. 201810260183.9, filed on Mar. 27, 2018, which is incorporated herein by reference in its entirety.

TECHNICAL FIELD

The present application relates to the field of communications technology, and in particular to a method and device for obtaining cell information.

BACKGROUND

In communication systems, in order to perform handover and interference coordination, a network device (for example, eNB) needs to establish and maintain a neighbor relation table for cells under the network device. Automatic neighbor relation (Automatic Neighbor Relation, ANR) function is used to assist the network device in discovering un-configured neighboring cells and trigger establishment and maintenance of corresponding entries in the neighbor relation table. The automatic neighbor relation mechanism is not only suitable for discovering intra-frequency neighbor cells, but also for discovering inter-frequency neighbor cells.

In the related art, in the automatic neighbor relation mechanism, after a user equipment receives ANR measurement configuration issued by the network device, the user equipment starts a timer T321. A timing duration of the timer T321 is set based on the radio access technology (Radio Access Technology, RAT), and different RATs are corresponding to different timing durations.

However, for the new radio (New Radio, NR) system, the frequency of the NR system is divided into multiple frequency ranges. Different frequency ranges vary greatly in frequency bandwidth, subcarrier spacing, etc., and capabilities of user equipment also vary greatly. If the method of setting the timing duration of the timer based on the RAT in the related art is adopted, the timing duration of the timer may be set unreasonably, which will affect obtaining of cell information and affecting effectiveness of communication.

SUMMARY

An object of embodiments of the present disclosure is to provide a method and device for obtaining cell information, which can provide a solution for the user equipment in the NR system to determine the timing duration of the timer, thereby enabling the user equipment to obtain cell information according to a more reasonable timing duration and then improving communication effectiveness.

In a first aspect, a method for obtaining cell information is provided and includes:

when receiving measurement configuration information, according to target information, determining a target timing duration of a timer; wherein the measurement configuration information is configured to instruct the user equipment to obtain identifier information of a target cell, the target information includes at least one of: frequency related information of the target cell, synchronization status of the target cell and a serving cell, capability information of the user equipment, and operation state related information of the user equipment;

when the identifier information is obtained within the target timing duration, reporting the identifier information to a network device.

In a second aspect, a user equipment is provided and includes:

a determining module configured to, when receiving measurement configuration information, according to target information, determine a target timing duration of a timer; wherein the measurement configuration information is configured to instruct the user equipment to obtain identifier information of a target cell, the target information includes at least one of frequency related information of the target cell, synchronization status of the target cell and a serving cell, capability information of the user equipment, and operation state related information of the user equipment;

a transceiver module configured to, when the identifier information is obtained within the target timing duration, report the identifier information to a network device.

In a third aspect, a user equipment is provided and includes: a memory, a processor, and a computer program stored on the memory and executable on the processor; wherein the computer program is executed by the processor to implement steps of the method for obtaining cell information in the first aspect.

In a fourth aspect, a computer readable medium is provided and includes a computer program stored thereon; wherein the computer program is executed by a processor to implement steps of the method for obtaining cell information in the first aspect.

In the embodiment of the present disclosure, when receiving the measurement configuration information instructing the user equipment to obtain the identifier information of the target cell, according to the frequency related information of the target cell, the synchronization status of the target cell and the serving cell, the capability information of the user equipment, and operation status related information of the user equipment, the user equipment determines the target timing duration of the timer. When the identifier information of the target cell is obtained within the target timing duration, the user equipment reports the identifier information to the network device. In this way, a more reasonable timing duration may be determined in the new radio (NR) system, and the cell information may be obtained based on the determined timing duration, thereby improving communication effectiveness.

BRIEF DESCRIPTION OF THE DRAWINGS

The drawings described herein are used to provide a further understanding of the present disclosure and constitute a part of the present disclosure. The exemplary embodiments and descriptions of the present disclosure are used to explain the present disclosure, and do not constitute an improper limitation of the present disclosure. In the drawings:

FIG. 1 is a schematic diagram of an application scenario of an embodiment of the present disclosure;

FIG. 2 is a schematic flow chart of a method for obtaining cell information according to an embodiment of the present disclosure;

DETAILED DESCRIPTION

Figure 3:
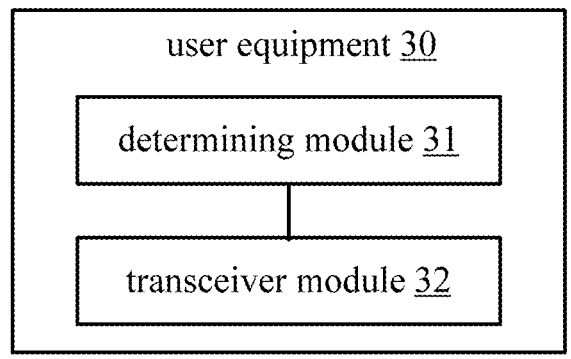
FIG. 3 is a schematic structural diagram of a user equipment according to an embodiment of the present disclosure.

The technical solutions in embodiments of the present disclosure will be described hereinafter in a clear and complete manner in conjunction with the drawings in the embodiments of the present disclosure. Obviously, the following embodiments are merely a part of, rather than all of, the embodiments of the present disclosure, and based on these embodiments, a person skilled in the art may obtain the other embodiments, which also fall within the scope of the present disclosure.

The technical solution of the present disclosure may be applied to various communication systems, such as long term evolution (Long Term Evolution, LTE)/long term evolution-advanced (Long Term Evolution-advanced, LTE-A) system, New Radio (NR) system.

A user equipment (User Equipment, UE), which may also be referred as a mobile terminal (Mobile Terminal) or a mobile user equipment, etc., may communicate with one or more core networks via a radio access network (for example, Radio Access Network, RAN). The user equipment may be a mobile terminal, such as a mobile phone (or referred as "cellular" phone), or a computer with a mobile terminal, such as, a portable, pocket-sized, hand-held, built-in computer or vehicle-mounted mobile device, which exchanges languages and/or data with the radio access network.

The network device is a device that is deployed in the radio access network to provide a wireless communication function for the user equipment. The network device may be a base station, and may be an evolved base station (eNB or e-NodeB, evolutional Node B) in the LTE or a 5G base station (gNB).

FIG. 1 is a schematic diagram of an application scenario according to an embodiment of the present disclosure. As shown in FIG. 1, the communication process between the user equipment and the network device includes the following procedures: (1) a user equipment completes normal cell measurement under a network device A and reports a measurement result through a measurement report, where the measurement report includes a frequency and a physical cell identifier (Physical Cell Identifier, PCI) of a cell B under a network device B; (2) the network device A determines that the cell B is an un-configured neighboring cell according to the frequency and the PCI in the measurement report, and the network device A instructs, through instruction signaling, the user equipment to obtain identifier information of the cell B, where the instruction signaling is transmitted to the user equipment form of measurement configuration; (3) after receiving the user equipment receives the measurement configuration, the user equipment starts a timer and starts to obtain a system message of the cell B, and further obtains the identifier information in the system message; (4) if the user equipment obtains the identifier information of the cell B before the timer expires, the user equipment reports the identifier information to the network device A, and the network device A adds the cell B to a neighbor relation table of a serving cell (cell A) of the user equipment.

In the related art, a timing duration of the timer is set based on the radio access technology (Radio Access Technology, RAT), and different RATs are corresponding to different timing durations. For the new radio (New Radio, NR) system, the frequency of the NR system is divided into multiple frequency ranges. Different frequency ranges vary greatly in frequency bandwidth, subcarrier spacing, etc., and capabilities of the user equipment also vary greatly. If the method of setting the timing duration of the timer based on the RAT in the related art is adopted, the timing duration of the timer may be set unreasonably, which will affect obtaining of cell information and affecting effectiveness of communication.

In order to solve the above problem, one embodiment of the present disclosure provides a method for obtaining cell information. The technical solutions provided in the embodiments of the present disclosure are described in detail hereinafter with reference to the accompanying drawings.

FIG. 2 shows a method for obtaining cell information according to an embodiment of the present disclosure. As shown in FIG. 2, the method includes the following steps.

S210: when receiving measurement configuration information, according to target information, determining a target timing duration of a timer; where the measurement configuration information is used to instruct a user equipment to obtain identifier information of a target cell, the target information includes at least one of frequency related information of the target cell, synchronization status of the target cell and a serving cell, capability information of the user equipment, and operation state related information of the user equipment.

It should be noted that the timer in the step S210 may be defined as stopping obtaining identifier information of the target cell (for example, a neighbor cell) and returning to the serving cell when the timer expires. A start time of the timer may be defined as a time when the measurement configuration information is received, or may be defined as a time when the user equipment reaches the target cell (for example, a neighbor cell) and starts to obtain the identifier information of the target cell.

Optionally, in the step S210, the measurement configuration information includes a frequency of the target cell and/or a physical cell identifier (Physical Cell Identifier, PCI). The user equipment can determine the target cell according to information included in the measurement configuration information. Further, the measurement configuration information is associated with a measurement identifier (ID).

Optionally, in the step S210, the identifier information of the target cell may be information used to uniquely identify the target cell. For example, the identifier information of the target cell includes at least one of a cell global identifier (Cell Global Identifier, CGI) of the target cell, a tracking area code (Tracking Area Code, TAC) of the target cell, and a public land mobile network (Public Land Mobile Network, PLMN) identifier of the target cell.

Optionally, in some embodiments, the target information includes frequency related information of the target cell. Then, in the step S210, according to target information, determining a target timing duration of a timer, includes: determining the target timing duration according to a target frequency range to which the frequency of the target cell belongs.

Further, the user equipment determines the target timing duration according to the target frequency range and a first correspondence, where the first correspondence includes correspondence between frequency ranges and timing durations. Here, the first correspondence may be pre-agreed by agreements, or may be configured by the network device for the user equipment through configuration information.

For example, the first correspondence may be as shown in Table 1. When the user equipment determines that the frequency of the target cell belongs to a frequency range A-B MHz, then it is determined that the target timing duration of the timer is M ms. When the user equipment determines the frequency of the target cell belongs to a frequency range C-D MHz, then it is determined that the target timing duration of the timer is N ms.

TABLE 1

| Frequency range | Timing duration |
| --- | --- |
| A-B MHz | M ms |
| C-D MHz | N ms |

Optionally, in other embodiments, the target information includes frequency related information of the target cell. Then, in the step S210, according to target information, determining a target timing duration of a timer, includes: determining the target timing duration according to a target frequency bandwidth range to which a frequency bandwidth corresponding to the frequency of the target cell belongs.

Further, the user equipment determines the target timing duration according to the target frequency bandwidth range and a second correspondence, where the second correspondence includes correspondence between frequency bandwidth ranges and timing durations. Here, the second correspondence may be pre-agreed by agreements, or may be configured by the network device for the user equipment through configuration information.

For example, the second correspondence may be as shown in Table 2. When the user equipment determines that the frequency bandwidth range corresponding to the frequency of the target cell belongs to a frequency bandwidth range A MHz, then it is determined that the target timing duration of the timer is M ms. When the user equipment determines that the frequency bandwidth range corresponding to the frequency of the target cell belongs to the frequency bandwidth range B MHz, then it is determined that the target timing duration of the timer is N ms.

TABLE 2

| Frequency bandwidth range | Timing duration |
| --- | --- |
| A MHz | M ms |
| B MHz | N ms |

Optionally, in other embodiments, the target information includes frequency related information of the target cell. Then, in the step S210, according to target information, determining a target timing duration of a timer, includes: determining the target timing duration of the timer according to a target subcarrier spacing corresponding to the frequency of the target cell.

Further, the user equipment determines the target timing duration according to the target subcarrier spacing and a third correspondence, where the third correspondence includes correspondence between subcarrier spacings and timing durations. Here, the third correspondence may be pre-agreed by agreement, or may be configured by the network device for the user equipment through configuration information.

For example, the third correspondence may be as shown in Table 3. When the user equipment determines that the target subcarrier spacing corresponding to the frequency of the target cell is 15 MHz, then it is determined that the target timing duration of the timer is 100 ms. When the user equipment determines that the target subcarrier spacing corresponding to the frequency of the target cell is 30 MHz, then it is determined that the target timing duration of the timer is 200 ms.

TABLE 3

| Subcarrier spacing | Timing duration |
| --- | --- |
| 15 MHz | 100 ms |
| 30 MHz | 200 ms |

Optionally, in other embodiments, the target information includes a synchronization status of the target cell and the serving cell. Then, in the step S210, according to target information, determining a target timing duration of a timer, includes: when the target cell is synchronized with the serving cell, determining that the target timing duration of the timer is a first preset duration; and when the target cell is not synchronized with the serving cell, determining that the target timing duration of the timer is a second preset duration. Here, the first preset duration and the second preset duration may be pre-agreed by agreements, or may be configured by the network device for the user equipment through configuration information.

Further, according to the system message of the serving cell, the user equipment determines whether the target cell is synchronized with the serving cell. The method shown in FIG. 2 further includes: receiving a system message of a serving cell, where the system message includes indication information indicating a synchronization status of the target cell and the serving cell; and determining synchronization status of the target cell and the serving cell according to the indication information.

In one embodiment of the present disclosure, optionally, the capability information of the user equipment includes at least one of the following: a capability category (Category) of the user equipment, a measurement gap capability of the user equipment, connectivity mode supported by the user equipment, and a capability of the user equipment to support carrier aggregation or dual connectivity. Correspondingly, the user equipment may determine the target timing duration of the timer based on at least one of the foregoing information included in the capability information.

For example, the user equipment determines the target timing duration according to a rule that the higher the capability category is, the shorter the target timing duration of the timer. Alternatively, a correspondence between the capability category and the timing duration may be configured by agreements or the network device, and the user equipment can determine the target timing duration according to its own capability category and the correspondence.

Alternatively, the user equipment determines the target timing duration of the timer according to whether a measurement gap (Gap) is required for an indicated measurement frequency (frequency of the target cell). For example, when the measurement gap is not required for the indicated measurement frequency, then it is determined that the target timing duration is a short value. Here, this short value may be pre-agreed by agreements or configured by the network device.

Alternatively, the user equipment determines the target timing duration of the timer according to a supported connectivity mode. For example, when the user equipment only supports a LTE-NR dual-connectivity (Dual-Connectivity) mode and does not support a NR standalone (Standalone) mode, the target timing duration of the timer is a long value. When the user equipment device supports NR standalone mode, the target timing duration is a short value. Here, the long value and the short value may be pre-agreed by agreements or configured by the network device.

Alternatively, the user equipment determines the target timing duration of the timer according to the capability of supporting carrier aggregation or dual connectivity. For example, when the user equipment supports carrier aggregation for frequency bands or dual connectivity, the target timing duration of the timer is a short value. Here, the short value may be pre-agreed by agreements or configured by the network device.

In one embodiment of the present disclosure, optionally, the operation status related information of the user equipment includes at least one of the following: a connectivity mode in which the user equipment operates, a frequency band of carrier aggregation in which the user equipment operates, and a frequency band of a dual connectivity carrier in which the user equipment operates. Correspondingly, the user equipment may determine the target timing duration of the timer based on at least one of the foregoing information included in the operation status related information.

For example, the user equipment determines the target timing duration of the timer according to the connectivity mode in which the user equipment operates. When the radio access technology (Radio Access Technology, RAT) of the user equipment includes RAT corresponding to the target cell, the target timing duration of the timer is a small value. For example, the user equipment operates in the LTE-NR dual-connectivity mode, and the user equipment has both LTE connectivity and NR connectivity simultaneously; when the user equipment needs to obtain identifier information of an NR neighbor cell (or understood as that the user equipment needs to measure the NR neighbor cell), the target timing duration is set to be a smaller value. When the user equipment operates in the LTE single connectivity without NR connectivity, the target timing duration of the timer is set to be a larger value. Here, the smaller value and the larger value may be pre-agreed by agreements or configured by the network device.

Alternatively, the user equipment determines the target timing duration of the timer according to a frequency band of carrier aggregation in which the user equipment operates or a frequency band of a dual connectivity carrier in which the user equipment operates. For example, when there is a measured frequency band (band or frequency range) in the frequency band of the carrier aggregation in which the user equipment operates or the frequency band of the dual connectivity carrier in which the user equipment operates, the target timing duration of the timer is a small value. Here, the small value may be pre-agreed by agreements or configured by the network device.

S220: when the identifier information is obtained within the target timing duration, reporting the identifier information to the network device.

Specifically, in some embodiments, the measurement configuration information is associated with a measurement identifier (ID). When the user equipment obtains the identifier information within the target timing duration, the user equipment reports the obtained identifier information and the measurement ID to the network device. Then the network device may add the target cell to the neighbor relation table of the serving cell. When the user equipment does not obtain the identifier information within the target timing duration, the user equipment reports the measurement ID to the network device. Since information reported by the user equipment does not include the identifier information, the network device can infer that the user equipment fails to obtain the required information, and then does not add the target cell to the neighbor relation table of the serving cell.

The method for obtaining cell information according to one embodiment of the present disclosure is described in details above with reference to FIG. 2. A user equipment according to an embodiment of the present disclosure will be described in detail hereinafter with reference to FIG. 3.

FIG. 3 is a schematic structural diagram of a user equipment according to an embodiment of the present disclosure. As shown in FIG. 3, a user equipment 30 includes:

a determining module 31 configured to, when receiving measurement configuration information, according to target information, determine a target timing duration of a timer; where the measurement configuration information is used to instruct a user equipment to obtain identifier information of a target cell, the target information includes at least one of frequency related information of the target cell, synchronization status of the target cell and a serving cell, capability information of the user equipment, and operation state related information of the user equipment;

a transceiver module 32 configured to, when the identifier information is obtained within the target timing duration, report the identifier information to the network device.

According to the user equipment in the embodiment of the present disclosure, when receiving the measurement configuration information instructing the user equipment to obtain the identifier information of the target cell, according to the frequency related information of the target cell, the synchronization status of the target cell and the serving cell, the capability information of the user equipment, and operation status related information of the user equipment, the user equipment determines the target timing duration of the timer. When the identifier information of the target cell is obtained within the target timing duration, the user equipment reports the identifier information to the network device. In this way, a more reasonable timing duration may be determined in the new radio (NR) system, and the cell information may be obtained based on the determined timing duration, thereby improving communication effectiveness.

Optionally, as an example, the target information includes frequency related information of the target cell.

The determining module 31 is specifically configured to:
determine the target timing duration according to a target frequency range to which the frequency of the target cell belongs.

Optionally, as an example, the determining module 31 is specifically configured to:
determine the target timing duration according to the target frequency range and a first correspondence,
where the first correspondence includes correspondence between frequency ranges and timing durations.

Optionally, as an example, the target information includes frequency related information of the target cell.

The determining module 31 is specifically configured to:
determine the target timing duration according to a target frequency bandwidth range to which a frequency bandwidth corresponding to the frequency of the target cell belongs.

Optionally, as an example, the determining module 31 is specifically configured to:
determine the target timing duration according to the target frequency bandwidth range and a second correspondence;
where the second correspondence includes correspondence between frequency bandwidth ranges and timing durations.

Optionally, as an example, the target information includes frequency related information of the target cell.

The determining module 31 is specifically configured to:

determine the target timing duration of the timer according to a target subcarrier spacing corresponding to the frequency of the target cell.

Optionally, as an example, the determining module 31 is specifically configured to:

determine the target timing duration according to the target subcarrier spacing and a third correspondence;

where the third correspondence includes correspondence between subcarrier spacings and timing durations.

Optionally, as an example, the target information includes a synchronization status between the target cell and a serving cell.

The determining module 31 is specifically configured to:

when the target cell is synchronized with the serving cell, determine that the target timing duration is a first preset duration; and when the target cell is not synchronized with the serving cell, determine that the target timing duration is a second preset duration.

Optionally, as an example, the transceiver module 32 is further configured to:

receive a system message of a serving cell, where the system message includes indication information indicating a synchronization status of the target cell and the serving cell; and determine synchronization status of the target cell and the serving cell according to the indication information.

Optionally, as an example, the capability information of the user equipment includes at least one of the following: a capability category of the user equipment, a measurement gap capability of the user equipment, connectivity mode supported by the user equipment, and a capability of the user equipment to support carrier aggregation or dual connectivity.

Optionally, as an example, the operation status related information of the user equipment includes at least one of the following: a connectivity mode in which the user equipment operates, a frequency band of carrier aggregation in which the user equipment operates, and a frequency band of a dual connectivity carrier in which the user equipment operates.

Optionally, as an example, the measurement configuration information includes a frequency of the target cell and/or a physical cell identifier (PCI).

Optionally, as an example, the identifier information of the target cell includes at least one of a cell global identifier (CGI) of the target cell, a tracking area code (TAC) of the target cell, and a public land mobile network (PLMN) identifier of the target cell.

The user equipment provided in the embodiment of the present disclosure can implement various procedures implemented by the user equipment in the method embodiment of FIG. 1. To avoid repetition, details are not described herein again.

Figure 4:
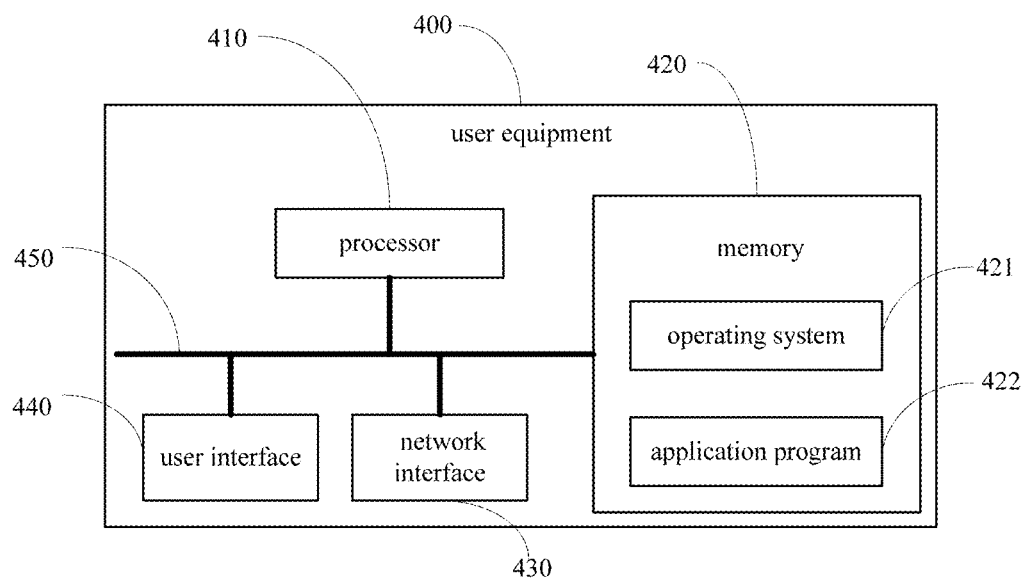
FIG. 4 is a schematic structural diagram of a user equipment according to an embodiment of the present disclosure.

FIG. 4 is a schematic structural diagram of a user equipment according to another embodiment of the present disclosure. As shown in FIG. 4, the user equipment 400 includes at least one processor 410, a memory 420, at least one network interface 430, and a user interface 440. Various components in the user equipment 400 are coupled together by a bus system 450. It should be understood that, the bus system 450 is configured to implement connection communication among these components. In addition to data bus, the bus system 450 further includes power bus, control bus and status signal bus. However, for clarity of description, various buses are labeled as bus system 450 in FIG. 4.

The user interface 440 may include a display device, a keyboard, a clicking device (e.g., a mouse, a trackball, a touchpad, or a touch screen, etc.).

It should be understood that, in the embodiment of the present disclosure, the memory 420 may be a transitory memory, or a non-transitory memory, or may include both of the transitory memory and the non-transitory memory. The non-transitory memory may be a read-only memory (Read-Only Memory, ROM), a programmable ROM (Programmable ROM, PROM), an erasable PROM (Erasable PROM, EPROM), an electrically EPROM (Electrically EPROM, EEPROM), or a flash memory. The transitory memory may be a random access memory (Random Access Memory, RAM), which is used as an external cache. Many forms of RAM are available by way of illustration and not limitation, e.g., a static RAM (Static RAM, SRAM), a dynamic RAM (Dynamic RAM, DRAM), a synchronous DRAM (Synchronous DRAM, SDRAM), a double data rate SDRAM (Double Data Rate SDRAM, DDRSDRAM), an enhanced SDRAM (Enhanced SDRAM, ESDRAIVI), a synchlink DRAM (Synchlink DRAM, SLDRAM) and a direct rambus RAM (Direct Rambus RAM, DRRAIVI). The memory 420 of the systems and methods described in the application is intended to include, without being limited to, these and any other suitable types of memory.

In some implementations, the memory 420 stores the following elements, executable modules, or data structures, or a subset thereof, or an extended set thereof: an operating system (OS) 421 and an application program 422.

The operating system 421 includes various system programs, e.g., a frame layer, a core library layer, a driver layer, etc., are used to implement various basic services and to handle hardware-based tasks. The application program 422 includes various applications, such as a media player (Media Player), a browser, and so on, for implementing various application services. A program implementing the method of the embodiments in the present disclosure may be included in the application program 422.

In one embodiment of the present disclosure, the user equipment 400 further includes: a computer program stored on the memory 420 and executable on the processor 410. The computer program is executed by the processor 410 to implement various steps of the method shown in FIG. 2 and the same technical effect can be achieved. In order to avoid repetition, it will not be repeated here.

The method provided by foregoing embodiments of the present disclosure may be applied to the processor 410, or may be implemented by the processor 410. The processor 410 may be an integrated circuit chip with signal processing capability. During the implementation process, each step of the foregoing method may be completed by an integrated logic circuit of hardware in the processor 410, or by an instruction in a form of software. The foregoing processor 410 may be a general processor, a digital signal processor (Digital Signal Processor, DSP), an application specific integrated circuit (Application Specific Integrated Circuit, ASIC), a field programmable gate array (Field Programmable Gate Array, FPGA), or other programmable logic devices, discrete gate or transistor logic device, discrete hardware components. Each method, step, and logic diagram provided by the embodiment of the present disclosure may be implemented, or executed. The general processor may be a microprocessor, or any conventional processor, and so on. The steps of the method provided by the embodiments of the present disclosure may be directly completed by the hardware decoding processor, or may be completed by a combination of hardware and software modules in the decoding processor. The software modules may be located in mature storage medium in the field, such as, the RAM, the flash memory, the ROM, the PROM, Electrically erasable programmable memory, and a register. The storage medium is located in the memory 420. The processor 410 reads information from the memory 420, and completes steps of foregoing method in combination with the hardware. Specifically, a computer program is stored on the computer readable storage medium, and the computer program is executed by the processor 410 to implement various steps of the method shown in FIG. 2.

It should be understood that, these embodiments described in the application may be implemented by hardware, software, firmware, middleware, microcode, or a combination thereof. For hardware implementation, a processing unit may be implemented in one or more application specific integrated circuit (Application Specific Integrated Circuits, ASICs), digital signal processor (Digital Signal Processor, DSP), DSP device (DSP Device, DSPD), programmable logic device (Programmable Logic Device, PLD), field-programmable gate array (Field-Programmable Gate Array, FPGA), general processors, controllers, microcontrollers, microprocessors, another electronic unit configured to implement the functions of the application or a combination thereof.

For software implementation, techniques described in the application may be implemented, by executing modules (e.g., process, function, etc.) with corresponding functions in the application. Software codes may be stored in the memory, and executed by the processor. The memory may be implemented in the processor, or external to the processor.

One embodiment of the present disclosure further provides a computer readable storage medium. The computer readable storage medium stores a computer program thereon. The computer program is executed by a processor to implement various steps of the method shown in FIG. 2 and the same technical effect can be achieved. In order to avoid repetition, it will not be repeated here. The computer readable storage medium, for example, may be a read-only memory (Read-Only Memory, ROM), a random access memory (Random Access Memory, RAM), a magnetic disk, and an optical disk.

It should also be noted that in this application, the term "including", "include" or any variants thereof is intended to cover a non-exclusive contain, so that a process, a method, an article or a device, which includes a series of elements, includes not only those elements, but also includes other elements which are not explicitly listed, or elements inherent in such a process, method, article or device. In absence of any further restrictions, an element defined by the phrase "including one . . . " does not exclude the existence of additional identical elements in a process, method, article, or device that includes the element.

Through the description of the above embodiments, those skilled in the art can clearly understand that the foregoing embodiment method can be implemented by means of software plus a necessary general hardware platform, and of course, can also be through hardware, but in many cases, the former is better. Based on such understanding, the technical solution of the present disclosure essentially or the part that contributes to the prior art may be embodied in the form of a software product. A computer software product is stored in a storage medium (such as ROM/RAM, magnetic disk, optical disk), including several instructions to enable a terminal (which may be a mobile phone, a computer, a server, an air conditioner, or a network device, etc.) to execute the method described in each embodiment of the present disclosure.

The embodiments of the present disclosure have been described above with reference to the drawings, but the present disclosure is not limited to the foregoing specific embodiments. The foregoing specific embodiments are merely illustrative and not restrictive. In the light of the present disclosure, those skilled in the art may make many variations without departing from the sprit and the protection scope of the claims, which fall within the protection of the present disclosure.

What is claimed is:

1. A method for obtaining cell information, to a user equipment, comprising:
when receiving measurement configuration information, according to target information, determining a target timing duration of a timer; wherein the measurement configuration information is configured to instruct the user equipment to obtain identifier information of a target cell, the target information comprises at least one of: frequency related information of the target cell, synchronization status of the target cell and a serving cell, capability information of the user equipment, and operation state related information of the user equipment;
when the identifier information is obtained within the target timing duration, reporting the identifier information to a network device;
wherein the target information comprises the frequency related information of the target cell;
wherein according to target information, determining a target timing duration of a timer, comprises;
determining the target timing duration according to a target frequency range to which the frequency of the target cell belongs;
or,
determining the target timing duration according to a target frequency bandwidth range to which a frequency bandwidth corresponding to the frequency of the target cell belongs.

2. The method according to claim 1, wherein determining the target timing duration according to a target frequency range to which the frequency of the target cell belongs, comprises:
determining the target timing duration according to the target frequency range and a first correspondence;
wherein the first correspondence comprises correspondence between frequency ranges and timing durations.

3. The method according to claim 1, wherein determining the target timing duration according to a target frequency bandwidth range to which a frequency bandwidth corresponding to the frequency of the target cell belongs, comprises:
determining the target timing duration according to the target frequency bandwidth range and a second correspondence;
wherein the second correspondence comprises correspondence between frequency bandwidth ranges and timing durations.

4. The method according to claim 1, wherein the capability information of the user equipment comprises at least one of the following: a capability category of the user equipment, a measurement gap capability of the user equipment, connectivity mode supported by the user equipment, and a capability of the user equipment to support carrier aggregation or dual connectivity.

5. The method according to claim 1, wherein the operation status related information of the user equipment comprises at least one of the following: a connectivity mode in which the user equipment operates, a frequency band of carrier aggregation in which the user equipment operates, and a frequency band of a dual connectivity carrier in which the user equipment operates.

6. The method according to claim 1, wherein the measurement configuration information includes a frequency of the target cell and/or a physical cell identifier (PCI).

7. The method according to claim 1, wherein the identifier information of the target cell comprises at least one of a cell global identifier (CGI) of the target cell, a tracking area code (TAC) of the target cell, and a public land mobile network (PLMN) identifier of the target cell.

8. A user equipment, comprising: a memory, a processor, and a computer program stored on the memory and executable on the processor; wherein the computer program is executed by the processor to implement:
when receiving measurement configuration information, according to target information, determining a target timing duration of a timer; wherein the measurement configuration information is configured to instruct the user equipment to obtain identifier information of a target cell, the target information comprises at least one of: frequency related information of the target cell, synchronization status of the target cell and a serving cell, capability information of the user equipment, and operation state related information of the user equipment;
when the identifier information is obtained within the target timing duration, reporting the identifier information to a network device;
wherein the target information comprises the frequency related information of the target cell;
the processor is specifically configured to:
determine the target timing duration according to a target frequency range to which the frequency of the target cell belongs;
or,
determine the target timing duration according to a target frequency bandwidth range to which a frequency bandwidth corresponding to the frequency of the target cell belongs.

9. The user equipment according to claim wherein the processor is specifically configured to:
determine the target timing duration according to the target frequency range and a first correspondence;
wherein the first correspondence comprises correspondence between frequency ranges and timing durations.

10. The user equipment according to claim wherein the processor is specifically configured to:
determine the target timing duration according to the target frequency bandwidth range and a second correspondence;
wherein the second correspondence comprises correspondence between frequency bandwidth ranges and timing durations.

11. A method for obtaining cell information, to a user equipment, comprising:
when receiving measurement configuration information, according to target information, determining a target timing duration of a timer; wherein the measurement configuration information is configured to instruct the user equipment to obtain identifier information of a target cell, the target information comprises at least one of: frequency related information of the target cell, synchronization status of the target cell and a serving cell, capability information of the user equipment, and operation state related information of the user equipment;
when the identifier information is obtained within the target timing duration, reporting the identifier information to a network device;
wherein the target information comprises the synchronization status of the target cell and the serving cell;
wherein according to target information, determining a target timing duration of a timer, comprises,
when the target cell is synchronized with the serving cell, determining that the target timing duration is a first preset duration; and
when the target cell is not synchronized with the serving cell, determining that the target timing duration is a second preset duration.

12. The method according to claim 11, further comprising:
receiving a system message of the serving cell, wherein the system message comprises indication information indicating the synchronization status of the target cell and the serving cell; and
determining synchronization status of the target cell and the serving cell according to the indication information.

* * * * *